(12) United States Patent
Song et al.

(10) Patent No.: US 11,326,861 B1
(45) Date of Patent: May 10, 2022

(54) ARROW SHAFT INCLUDING CARBON FIBER SHEET HAVING TRANSFER LAYER FORMED THEREON

(71) Applicants: Yun Il Song, Busan (KR); Yun Sub Song, Busan (KR); Yun Jae Song, Busan (KR)

(72) Inventors: Yun Il Song, Busan (KR); Yun Sub Song, Busan (KR); Yun Jae Song, Busan (KR)

(*) Notice: Subject to any disclaimer, the term of this patent is extended or adjusted under 35 U.S.C. 154(b) by 95 days.

(21) Appl. No.: 17/074,601

(22) Filed: Oct. 19, 2020

(51) Int. Cl.
*F42B 6/04* (2006.01)
*F41H 3/00* (2006.01)
*B32B 7/12* (2006.01)
*B32B 1/08* (2006.01)

(52) U.S. Cl.
CPC .............. *F42B 6/04* (2013.01); *B32B 1/08* (2013.01); *B32B 7/12* (2013.01); *F41H 3/00* (2013.01); *B32B 2262/106* (2013.01)

(58) Field of Classification Search
CPC ..................................... F42B 6/02; F42B 6/04
See application file for complete search history.

(56) References Cited

U.S. PATENT DOCUMENTS

| | | | | |
|---|---|---|---|---|
| 6,866,599 B2* | 3/2005 | Eastman, II | ............ | F42B 6/04 473/578 |
| 7,608,002 B2* | 10/2009 | Eastman, II | ............ | F42B 6/04 473/578 |
| 8,579,739 B2* | 11/2013 | Song | ................. | F42B 6/04 473/578 |
| 9,194,671 B1* | 11/2015 | Song | ................. | F42B 6/04 |
| 10,145,643 B1* | 12/2018 | Huang | ............... | F41B 5/1403 |
| 10,907,942 B2* | 2/2021 | Greenwood | ............ | F42B 6/04 |
| 2003/0073524 A1* | 4/2003 | Song | ................. | F42B 6/04 473/578 |
| 2006/0084534 A1* | 4/2006 | Flowers | ............... | F42B 6/04 473/578 |
| 2017/0321999 A1* | 11/2017 | Hoefer | ............... | B29C 63/0073 |

FOREIGN PATENT DOCUMENTS

KR          10-0131044 A          11/1997

* cited by examiner

*Primary Examiner* — John A Ricci
(74) *Attorney, Agent, or Firm* — Insight Law Group, PLLC; Seung Lee (57) ABSTRACT

The present invention provides an arrow shaft including a carbon fiber sheet having a transfer layer formed thereon, wherein the carbon fiber sheet is formed to extend in one direction and includes a plurality of carbon fiber layers in which a camouflage layer is formed on at least a part of an outermost layer thereof, and at least one transfer layer is formed on one surface of at least one of the carbon fiber layer and the camouflage layer.

16 Claims, 13 Drawing Sheets

ARROW SHAFT INCLUDING CARBON FIBER SHEET HAVING TRANSFER LAYER FORMED THEREON

BACKGROUND

1. Field of the Invention

The present invention relates to an arrow shaft including a carbon fiber sheet having a transfer layer formed thereon.

2. Discussion of Related Art

Arrows generally consist of an arrow shaft which is a hollow cylinder, an arrowhead mounted on the front end of the arrow shaft, a nock mounted on the rear end of the arrow shaft, and feathers attached to the rear outer circumferential surface of the arrow shaft.

When the arrow is shot repeatedly several times, the paradox phenomenon has a greater effect on the arrow shaft than expected, and the arrow shaft is bent like a bow while changing the direction countless times based on the pressure point (center of gravity) during flight. When the arrow shaft successively experiences this phenomenon, deformation or breakage occurs in the middle part of the arrow shaft, where the center of gravity is located.

At the moment when the arrow is shot from a bow, the archer's paradox phenomenon occurs. In this case, when the strength, weight, length, and the like of the shaft are not appropriate for the strength of the bow, the arrow does not fly straight.

In general, the high strength of the back means that the strength of the arrow, that is, the strength of the back of the arrow, is higher than the strength of the bow, and the low strength of the back means that the strength of the arrow is lower than the strength of the bow.

Therefore, to measure the strength of the shaft, a weight is suspended at the center of the shaft, and the degree of bending is measured. Based on the measurement, a shaft appropriate for the strength of the bow is selected. Here, the degree of bending is referred to as spine.

As the spine of the arrow shaft increases, the arrow flies straight, or there is little deformation of the material caused by frequent occurrence of the paradox phenomenon. However, since the spine of the arrow needs to be determined in consideration of the strength of the bow, it is not necessarily advantageous to unconditionally increase the spine. In addition, increasing the spine of the arrow leads to an increase in material costs and production costs.

Meanwhile, the arrow shaft is subjected to different external forces depending on each position in the longitudinal direction thereof. That is, the middle part of the arrow shaft is frequently subjected to a bending force due to the paradox phenomenon as described above, so it is easy to become weak by long-term use, and the front part of the arrow shaft, on which the arrowhead is mounted, is the part that gets the greatest shock when hitting the target during frequent shooting. On the other hand, the rear part of the arrow shaft, on which the nock is mounted, is the part that gets the greatest shock caused by a bowstring.

Meanwhile, the conventional arrow shafts are manufactured by sequentially laminating a plurality of sheets and winding the laminated sheets around a mandrel. In particular, when the sheets include carbon to reinforce strength, there is a problem in that the visual pattern of the surface layer exposed to the outside of the arrow shaft may be reduced or faded.

The contents described as the background art are merely provided to help in understanding the background of the present invention, and thus it should not be taken as an admission that they correspond to the conventional art already known to those of ordinary skill in the related art.

PRIOR-ART DOCUMENTS

Patent Documents (Patent Document 0001) Korean Registered Patent No. 10-0131044 (Nov. 26, 1997)

SUMMARY OF THE INVENTION

The present invention is directed to providing an arrow shaft including a carbon fiber sheet with improved visibility, which is formed by arranging and laminating carbon fibers in a specific form on a hollow straight tube and has a plurality of transfer layers formed to allow the pattern of the outermost sheet layer to stand out so that the pattern of the outermost sheet layer may be more clearly visible.

However, the objective of the present invention is not limited to the objective described above, and other objectives not described above will be clearly understood by those skilled in the art from the following description.

The present invention provides an arrow shaft including a carbon fiber sheet having a transfer layer formed thereon, wherein the carbon fiber sheet is formed to extend in one direction and includes a plurality of carbon fiber layers in which a camouflage layer is formed on at least a part of an outermost layer thereof, and at least one transfer layer is formed on one surface of at least one of the carbon fiber layer and the camouflage layer.

According to an embodiment of the present invention, a resin layer may be formed on at least one surface of the camouflage layer and the transfer layer.

According to an embodiment of the present invention, the resin layer may include an adhesive resin at 40 to 50 wt %.

According to an embodiment of the present invention, the transfer layer may include: a film layer; a backing agent applied onto the film layer; a release agent formed on the backing agent; a white and colored background layer formed at least once; and a glue sheet layer formed on the background layer.

According to an embodiment of the present invention, the background layer may include a curing agent at 1 to 5 wt %.

According to an embodiment of the present invention, the transfer layer may have a brightness of 50% or less with respect to 100% of a brightness of the camouflage layer.

According to an embodiment of the present invention, the transfer layer may be formed by performing transfer at least three times, but the present invention is not limited thereto.

According to an embodiment of the present invention, the transfer layer may have a white-white-white color or a white-pattern-pattern color.

According to an embodiment of the present invention, the transfer layer may at least partially include graphene.

According to an embodiment of the present invention, the camouflage layer may include 70 to 90% cotton and 10 to 30% nylon.

According to an embodiment of the present invention, the transfer layer may further include a reflective material.

According to an embodiment of the present invention, carbon fibers in the plurality of carbon fiber layers may be cross-arranged in a direction of 0 to 90 degrees.

The present invention also provides a method of manufacturing the above-described arrow shaft, which includes sequentially forming an adhesive resin layer and a transfer layer on at least one surface of a carbon fiber sheet including a plurality of carbon fiber layers, wherein the formation of the transfer layer includes: applying a backing agent onto at least one surface of a film; forming a release agent on the backing agent; forming a white and colored background layer at least once; and forming a glue sheet layer on the background layer.

According to an embodiment of the present invention, the method may further include forming a camouflage layer on an outer surface of the glue sheet layer of the carbon fiber sheet.

According to an embodiment of the present invention, an adhesive resin layer and a release layer may be sequentially formed on one surface of the camouflage layer.

According to an embodiment of the present invention, the resin layer may include an adhesive resin at 40 to 50 wt %.

Other details of embodiments are included in the detailed description and accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present invention will be described in detail with reference to the accompanying drawings. In giving reference numerals to components of the drawings, it should be noted that the same components have the same reference numerals as much as possible although being shown in different drawings. Further, in the description of the embodiments of the present invention, a detailed description of known configurations or functions incorporated herein will be omitted to avoid making the subject matter of the present invention unclear.

It should be understood that, although the terms first, second, A, B, (a), (b), and the like may be used herein to describe elements in the embodiments of the present invention, the nature, orders or sequences of these elements should not be limited by these terms. These terms are used only to distinguish one element from another. In addition, unless defined otherwise, all the terms (including technical and scientific terms) used herein have the same meaning as commonly understood by those skilled in the art to which the present invention belongs. It will be further understood that the terms, such as those defined in commonly used dictionaries, should be interpreted as having meanings that are consistent with their meanings in the context of the relevant art, and will not be interpreted in an idealized or overly formal sense unless expressly defined otherwise herein.

Hereinafter, an arrow shaft including a carbon fiber sheet having a transfer layer formed thereon according to an embodiment of the present invention will be described with reference the accompanying drawings.

Figure 1:
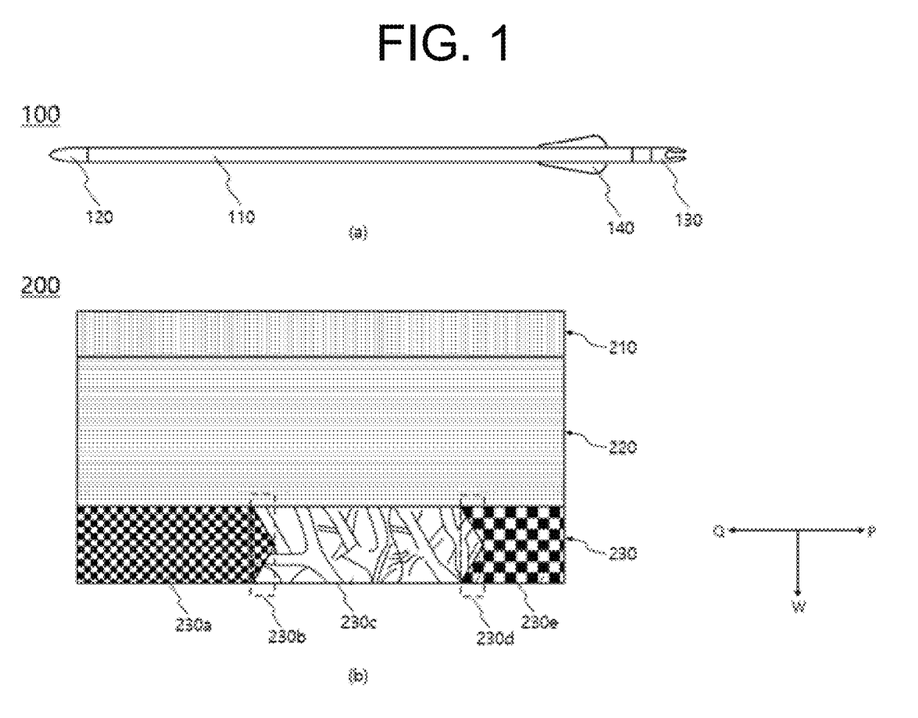
FIG. 1 shows a configuration diagram of an exterior of an arrow shaft and a configuration diagram of a carbon fiber sheet according to an embodiment of the present invention.
Figure 2:
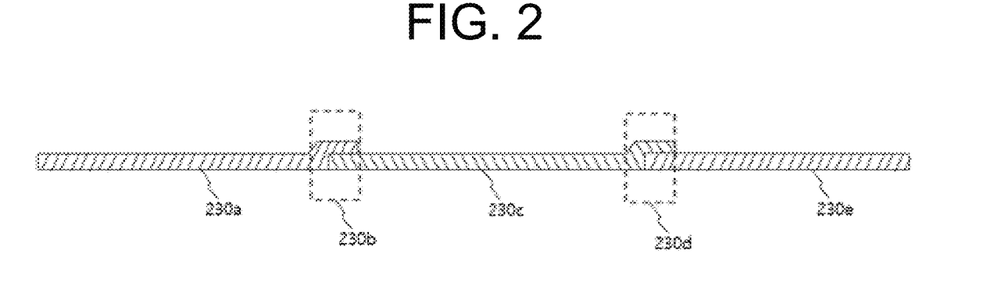
FIG. 2 is a partial cross-sectional view of an arrow shaft according to an embodiment of the present invention.
Figure 3:
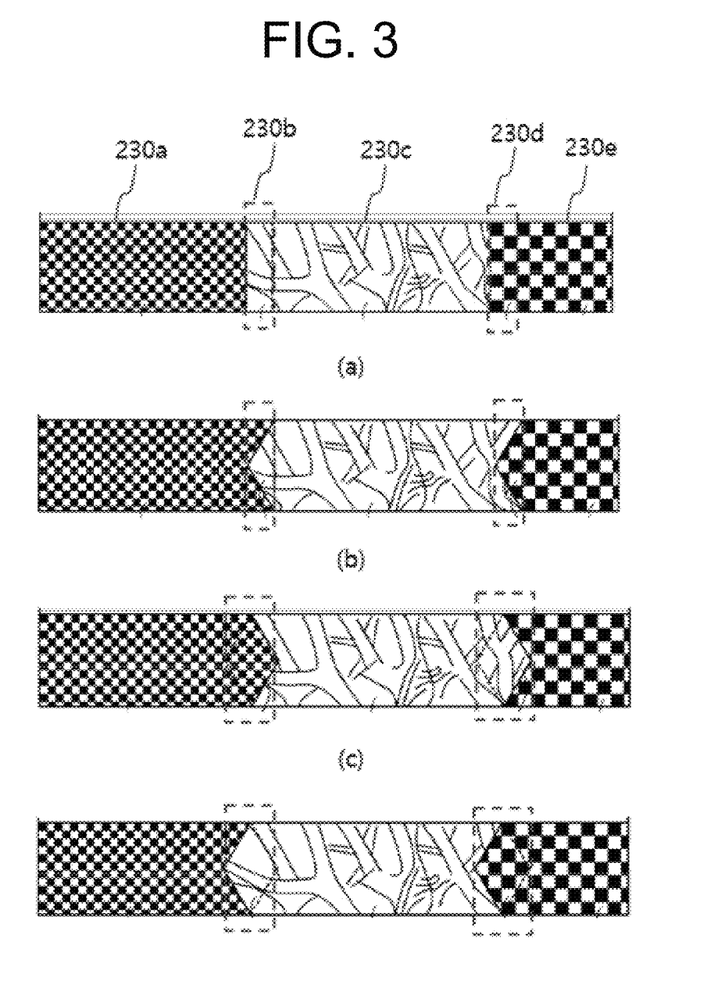
FIGS. 3 to 7 are partial configuration diagrams of carbon fiber sheets according to various embodiments of the present invention.
Figure 4:
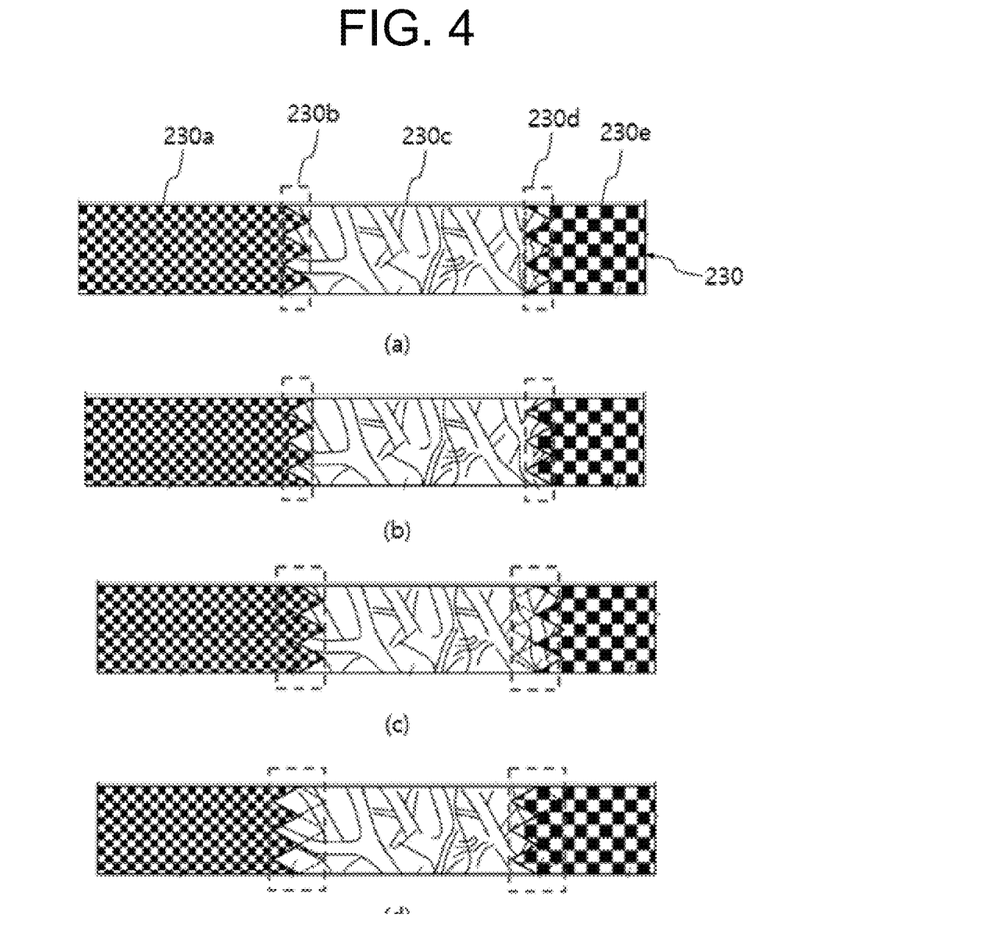
Figure 5:
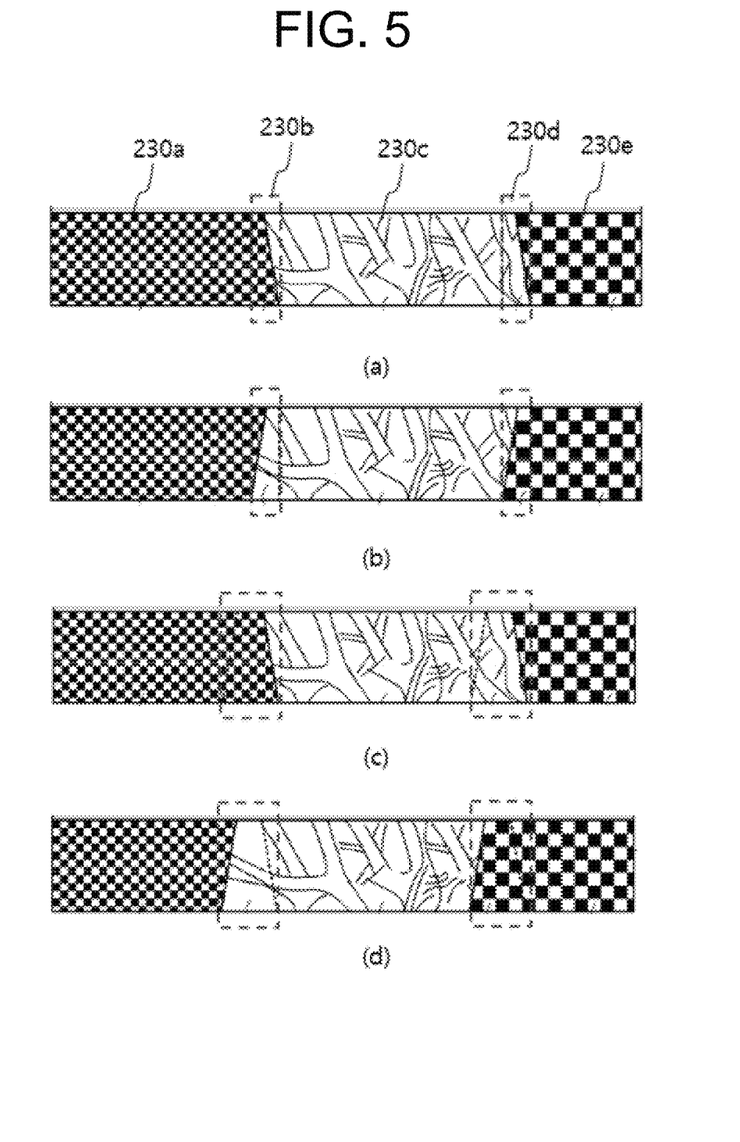
Figure 6:
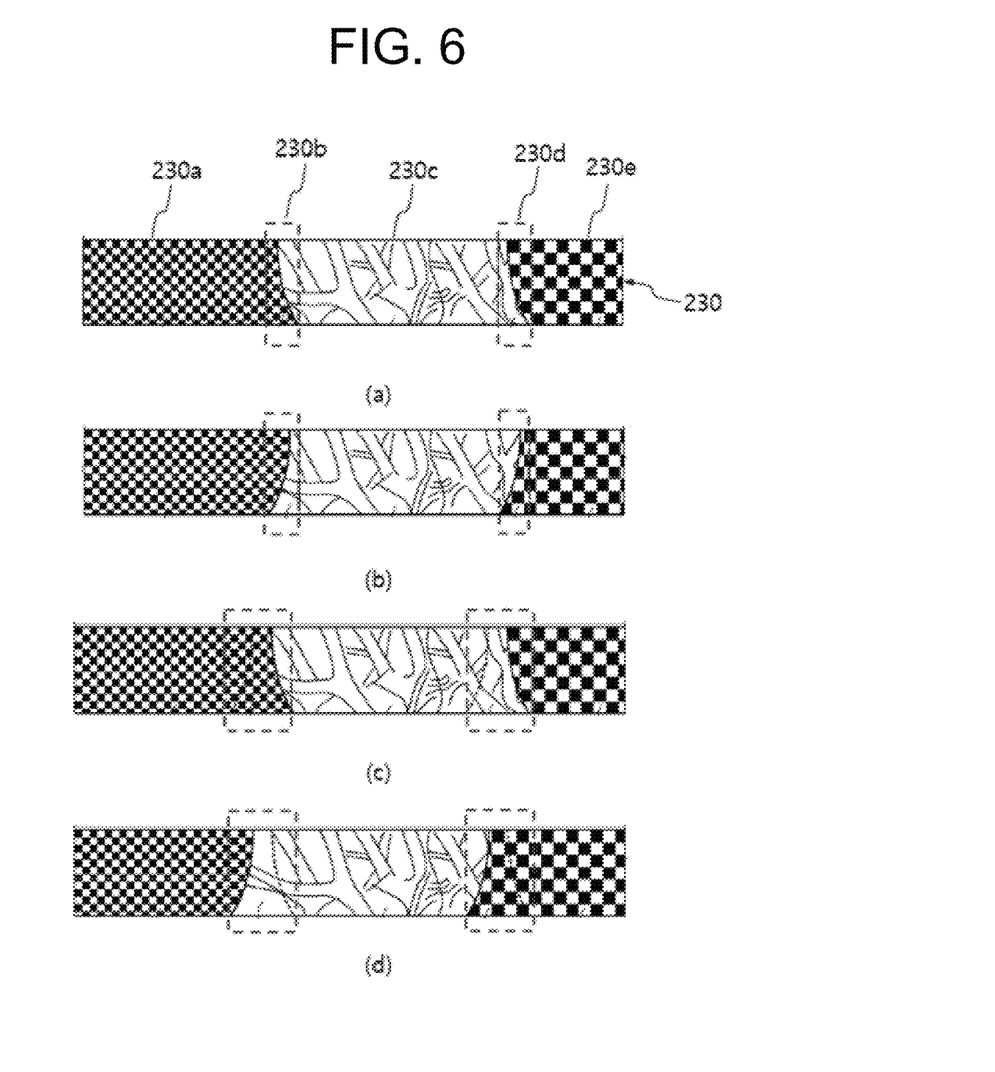
Figure 7:
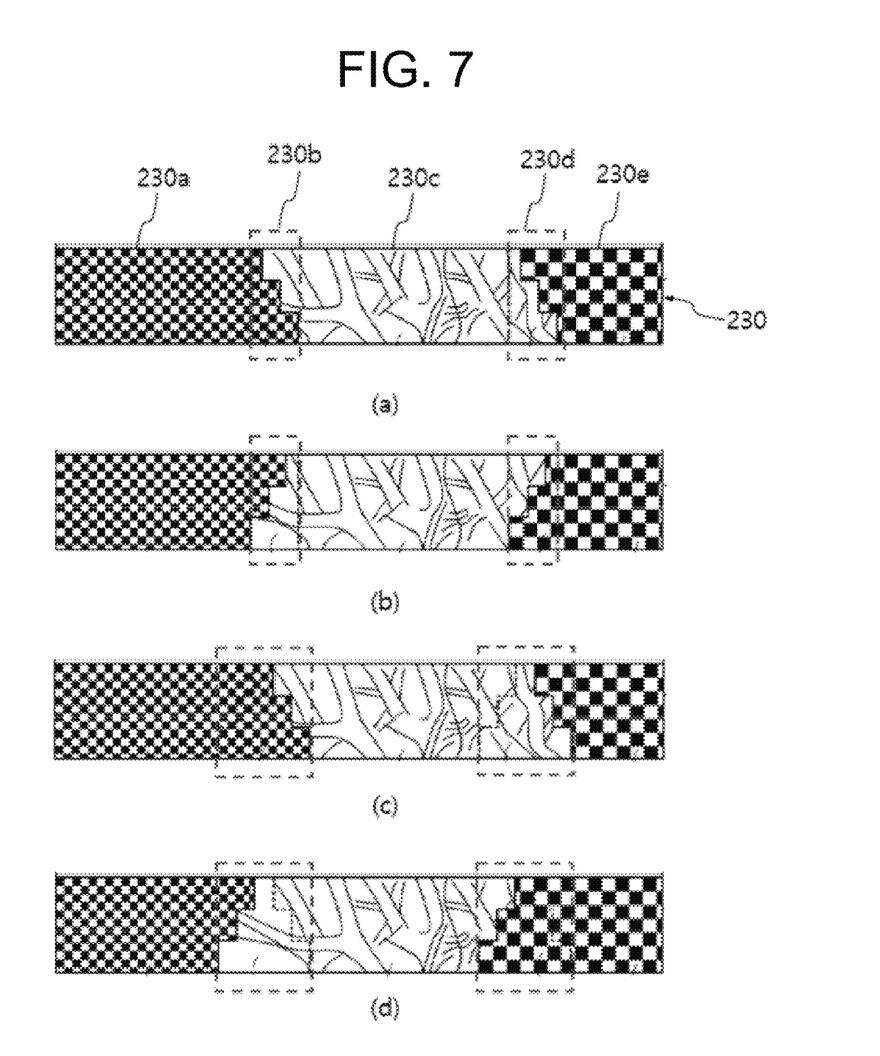

FIG. 1 shows a configuration diagram of an exterior of an arrow shaft and a configuration diagram of a carbon fiber sheet according to an embodiment of the present invention, FIG. 2 is a partial cross-sectional view of an arrow shaft according to an embodiment of the present invention, and FIG. 3 to FIG. 5 are partial configuration diagrams of carbon fiber sheets according to various embodiments of the present invention.

Referring to FIG. 1 to FIG. 5, an arrow shaft 100 having a transfer layer formed therein according to the present invention may consist of an arrow shaft body 110 formed to extend in one direction, an arrowhead 120, a nock 130, and a carbon fiber sheet 200 wound around the arrow shaft body 110. In the drawing, an undescribed reference numeral 140 denotes feathers of an arrow.

In this case, the carbon fiber sheet 200 wound around the arrow shaft body 110 may be provided in the form in which carbon fiber layers are laminated, and a transfer layer 500 (see FIG. 8) according to the present invention may be formed on one surface of a camouflage layer 300 (see FIG. 8) with a pattern which is wound around the outermost layer of the carbon fiber sheet 200.

The arrow shaft body 110 may be formed by impregnation of a plurality of carbon fibers, glass fibers, or carbon fiber fabrics, which are arranged in parallel in one direction, in a transparent or translucent resin or by prepreg treatment thereof. That is, the arrow shaft body 110 may be manufactured by impregnating a resin, such as an epoxy resin, a polyester resin, a thermoplastic resin, or the like, with carbon fibers.

The arrow shaft 100 is generally formed using an arrow shaft-forming sheet and manufactured through a process of cutting the forming sheet 200, lamination/winding processes, a taping process, thermal treatment/cooling processes, a core removal process, and a grinding process in the order as written.

Such an arrow shaft-forming sheet is made of an elastic sheet such as a carbon fiber sheet or a glass fiber sheet, or a combination of an elastic sheet with an inelastic sheet such as a fiber sheet having a camouflage pattern printed or transferred therein.

The tonnage of a carbon fiber or glass fiber prepreg sheet refers to the weight loaded on a size having a width of 1 mm and a length of 1 mm. For example, a case in which the tonnage of a carbon fiber sheet is 24 tons is expressed as 24 ton/mm$^2$. Therefore, as the tonnage of a carbon fiber sheet is higher, the sheet has higher strength and higher elasticity. In the following description, the tonnage, spine, and elastic strength of a carbon fiber sheet are defined and used with the same concept.

Assuming that the thicknesses of such carbon fiber sheets or glass fiber sheets are the same, it can be confirmed that as the number of carbon fiber sheets or glass fiber sheets arranged per unit area is larger or the weight thereof is higher, the better the elastic strength. In addition, a carbon fiber fabric or a glass fiber fabric, which is woven by crossing carbon fibers or glass fibers arranged in different directions, has superior elastic strength and is not easily torn, as compared with a sheet consisting of only carbon fibers or glass fibers arranged in one direction.

Meanwhile, the arrow shaft 100 includes the carbon fiber sheet 200 wound around the exterior thereof and including a plurality of carbon fiber layers, and the carbon fiber sheet 200 may consist of a plurality of carbon fiber sheet layers 210, 220, and 230. As described above, individual carbon fiber sheet layers 210, 220, and 230 may be formed by prepreg treatment of a plurality of carbon fibers, glass fibers, or carbon fiber fabrics, which are arranged in parallel in one direction. That is, the carbon fiber sheet layers may be manufactured by impregnating a resin, such as an epoxy resin, a polyester resin, a thermoplastic resin, or the like, with carbon fibers. Of course, the number of carbon fiber sheet layers constituting the carbon fiber sheet 200 is not particularly limited.

According to the present invention, after the carbon fiber sheet 200 including the plurality of carbon fiber layers is additionally subjected to resin and transferring processes, a camouflage fabric may be wound around the outermost layer of the carbon fiber sheet. That is, since the carbon fiber sheet 200 including the plurality of carbon fiber layers exhibits a dark black, when a camouflage fabric which has a color/color sense, a pattern, a shape, or the like is wound around the outermost layer, the color/color sense, pattern, shape, or the like may be faded or be remarkably unclearly visible due to the black background. Therefore, the present invention has a feature in that the color/color sense, pattern, shape, or the like of the camouflage fabric 300 wound around the outermost layer may be visually ensured using a brightness difference by forming a transfer layer 500 on the camouflage fabric. This will be described below in more detail with reference to the drawings.

Specifically, the carbon fiber sheet 200 may include a first carbon fiber sheet layer 210, a second carbon fiber sheet layer 220, and a third carbon fiber sheet layer 230. The carbon fiber sheet 200 may be wound while the first carbon fiber sheet layer 210, the second carbon fiber sheet layer 220, and the third carbon fiber sheet layer 230 are sequentially wound in a first direction W. In this case, the first carbon fiber sheet layer 210 is the lowermost sheet layer in direct contact with a mandrel and may be formed of a carbon fiber sheet or a glass fiber sheet having relatively low elasticity and low strength. When the first carbon fiber sheet layer 210 is formed of a glass fiber sheet, the transparency of the arrow shaft 100 may be improved.

The second carbon fiber sheet layer 220 is connected to the first carbon fiber sheet layer 210 so that the arrangement of glass fibers (GFs) of the second carbon fiber sheet layer 220 is orthogonal to that of the first carbon fiber sheet layer 210. The third carbon fiber sheet layer 230 is divided into three parts in the longitudinal direction of the arrow shaft 100, and each part may be formed of different carbon fiber sheets or glass fiber sheets.

Here, the third carbon fiber sheet layer 230 may have a structure in which a first sheet portion 230*a*, a second sheet portion 230*c*, and a third sheet portion 230*e* are connected, as shown in FIG. 2. A first overlapping portion 230*b* may be formed at a position where the first sheet portion 230*a* and the second sheet portion 230*c* overlap, and a second overlapping portion 230*d* may be formed at a position where the second sheet portion 230*c* and the third sheet portion 230*e* overlap. Such overlapping portions, the first overlapping portion 230*b* and the second overlapping portion 230*d*, may be formed in various shapes as shown in FIGS. 3 to 5.

That is, the end of the first sheet portion 230*a* overlaps the upper surface of the end of the second sheet portion 230*c*, or the end of the second sheet portion 230*c* overlaps the upper surface of the end of the first sheet portion 230*a*, and thus the first overlapping portion 230*b* may be formed. In addition, the end of the second sheet portion 230*c* overlaps the upper surface of the end of the third sheet portion 230*e*, or the end of the third sheet portion 230*e* overlaps the upper surface of the end of the second sheet portion 230*c*, and thus the second overlapping portion 230*d* may be formed.

In this case, as shown in FIGS. 3 to 7, the first overlapping portion 230*b* and the second overlapping portion 230*d*, which are formed between the first sheet portion 230*a* and the second sheet portion 230*c* and between the second sheet portion 230*c* and the third sheet portion 230*e*, respectively, may be formed in a rectangular, saw-toothed, trapezoidal, curved, or stepped shape in a plan view, and additionally, in various shapes such as triangular, hornlike, rhombic, diamond, and funnel shapes. In particular, the first overlapping portion 230*b* and the second overlapping portion 230*d* may be formed so that the first sheet portion 230*a* overlaps the upper surface of the second sheet portion 230*c* or the second sheet portion 230*c* overlaps the upper surface of the first sheet portion 230*a*. In some cases, the first overlapping portion 230*b* may be formed to overlap each of the first sheet portion 230*a* and the second sheet portion 230*c* or may be formed eccentrically toward only the first sheet portion 230*a* or the second sheet portion 230*c*.

According to the present invention, depending on the various shapes and overlapping range of the first overlapping portion 230*b* and the second overlapping portion 230*d*, the force transmitted to the arrow shaft 100 may be offset or dispersed. For example, by configuring the first overlapping portion 230*b* and the second overlapping portion 230*d* in a second direction P so that the widths of the first overlapping portion 230*b* and the second overlapping portion 230*d* are linearly or non-linearly increased in the first direction W or configuring the same in the second direction P so that the widths of the first overlapping portion 230*b* and the second overlapping portion 230*d* are linearly or non-linearly increased in the first direction W and a third direction Q, the force applied to the arrow shaft 100 may be offset or dispersed, resulting in improved strength. The planar overlapping shapes of the first overlapping portion 230*b* and the second overlapping portion 230*d* are not particularly limited.

Figure 8:
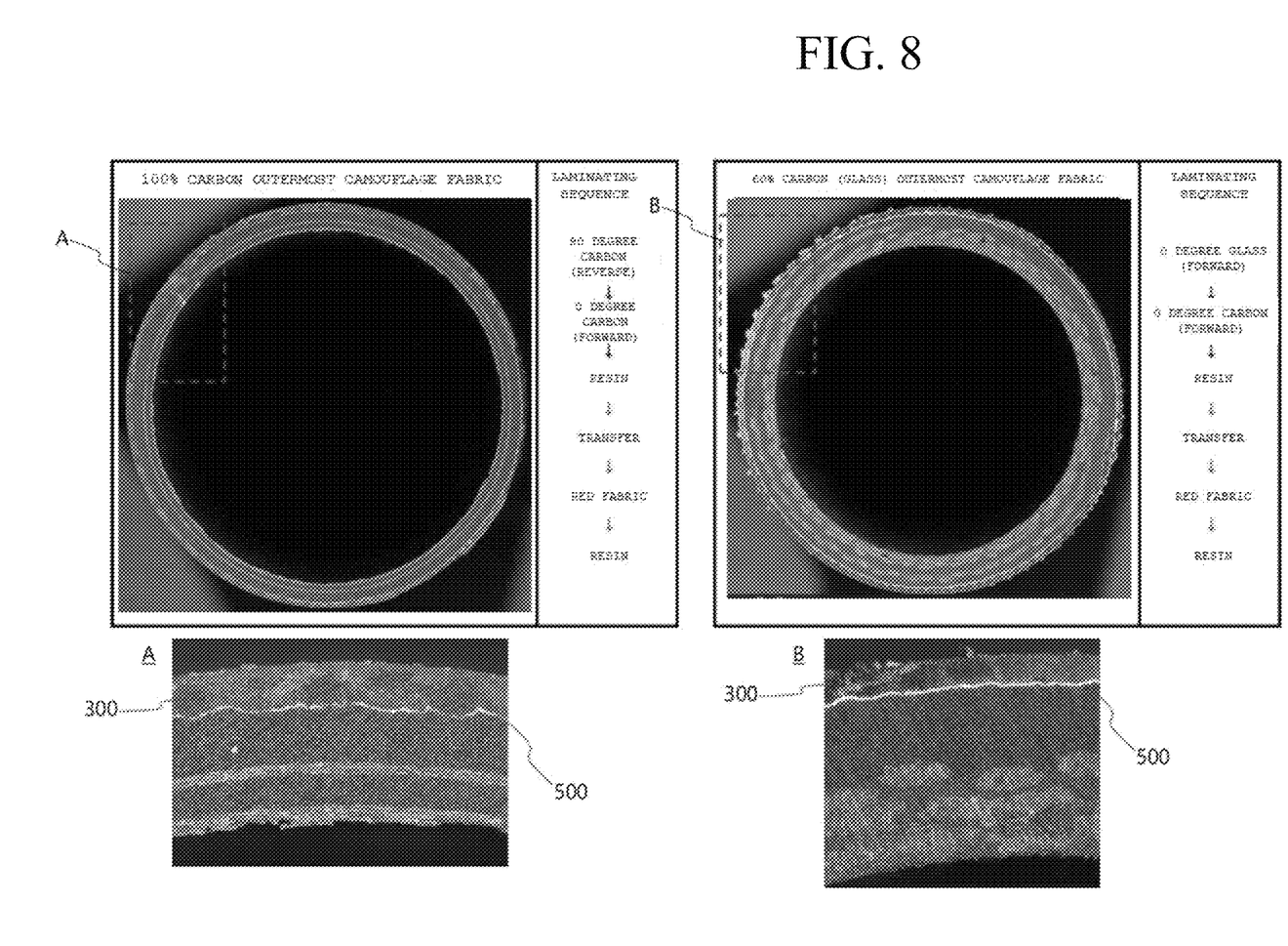
FIGS. 8 and 9 are partial cross-sectional images of an arrow shaft according to an embodiment of the present invention.
Figure 9:
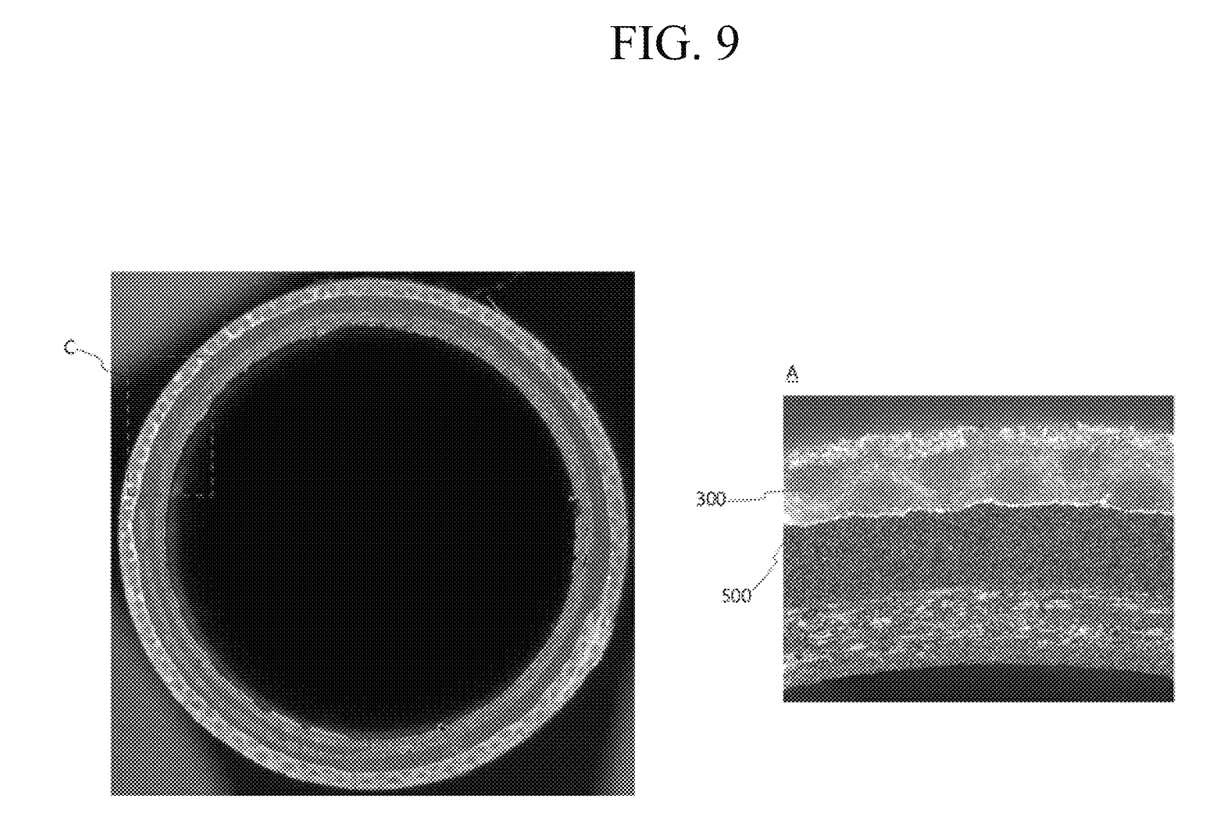

FIGS. 8 and 9 are partial cross-sectional images of an arrow shaft in which a transfer layer is formed on a camouflage fabric according to an embodiment of the present invention.

Referring to FIGS. 8 and 9, after the above-described carbon fiber sheet 200 is wound around the arrow shaft 100 according to the present invention, the camouflage fabric 300 may be wound therearound, and the transfer layer 500 may be formed on one surface of the camouflage fabric 300. That is, the transfer layer 500 may be formed between the carbon fiber sheet 200 and the camouflage fabric 300, and the transfer layer 500 may be formed on the upper surface of the carbon fiber sheet 200 or the lower surface of the camouflage fabric 300.

Specifically, the plurality of carbon fiber layers of the carbon fiber sheet 200 may be formed so that carbon fibers have a specific orientation in one direction. That is, when the carbon fiber sheet 200 is wound, the carbon fiber layers may be laminated so that carbon fibers are cross-arranged in a direction parallel or perpendicular to the first direction W.

In this case, the camouflage fabric 300 according to the present invention may be wound around the carbon fiber sheet 200, and the transfer layer 500 may be formed by being applied onto the lower surface of the camouflage fabric 300. Since the transfer layer 500, which has a bright color rather than the carbon background, is applied onto the lower surface of the camouflage fabric 300, the color, color sense, and the like of the camouflage fabric 300 may stand out.

According to the present invention, for the color, color sense, pattern, and the like of the camouflage fabric 300 to stand out, a difference in brightness between the camouflage fabric 300 and the transfer layer 500 may be used. For example, when the transfer layer 500 is formed to have a brightness of about 50% or less with respect to the brightness of the camouflage fabric 300, various colors, color senses, patterns, and the like according to the type of the camouflage fabric 300 may most effectively stand out.

In addition, the camouflage fabric 300 may include, for example, 70 to 90% cotton and 10 to 30% nylon in consideration of characteristics of the mixed ingredients included in the fabric material.

Furthermore, the transfer layer 500 may include graphene or carbon nanotubes (CNTs) as a carbon material. Therefore, when such a carbon material such as graphene or CNTs is included, it is possible to provide an effect of facilitating bonding to the resin.

In addition, a resin layer may be formed between the carbon fiber sheet 200 and the camouflage fabric 300 and formed on the camouflage layer 300. The resin layer may promote the curing of the camouflage fabric 300 to improve the adhesion of the transfer layer 500 and carbon. In this case, according to the present invention, the resin layer may include an adhesive polymer resin at 40 to 50 wt %. Preferably, the adhesive polymer resin is included at 45 wt %.

Hereinafter, a method of manufacturing the above-described arrow shaft having a transfer layer formed therein according to an embodiment of the present invention will be described with reference the drawings.

Figure 10:
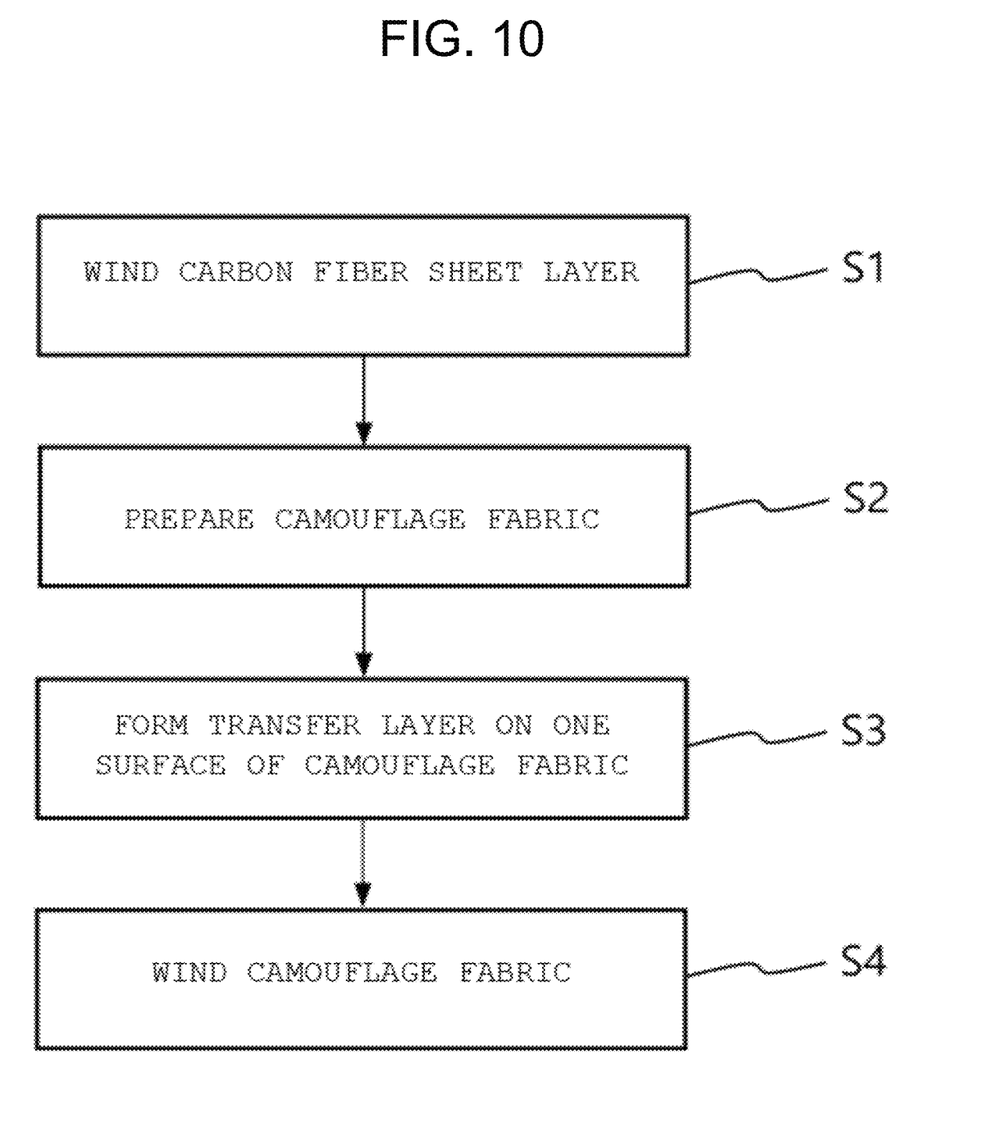
FIG. 10 is a flowchart of an arrow shaft manufacturing process according to an embodiment of the present invention.
Figure 11:
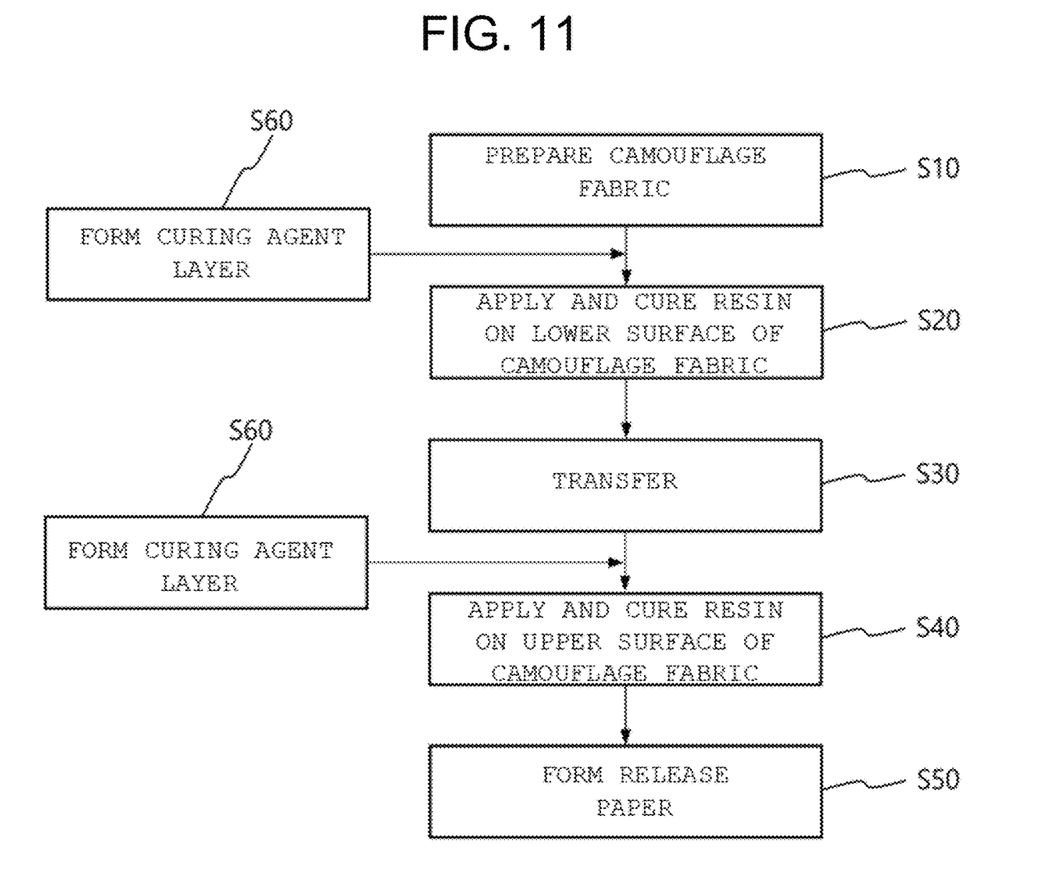
FIG. 11 is a flowchart of a camouflage fabric coating process of an arrow shaft according to an embodiment of the present invention.
Figure 12:
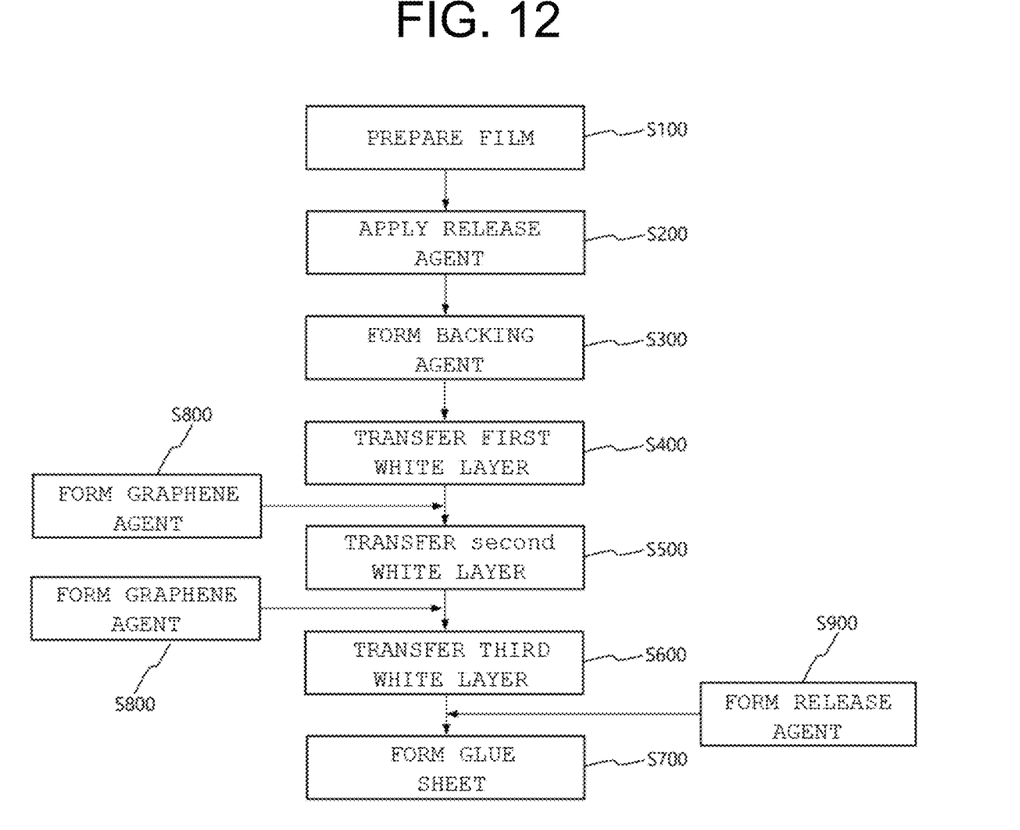
FIGS. 12 and 13 are flowcharts of a transfer layer formation process of an arrow shaft according to an embodiment of the present invention.
Figure 13:
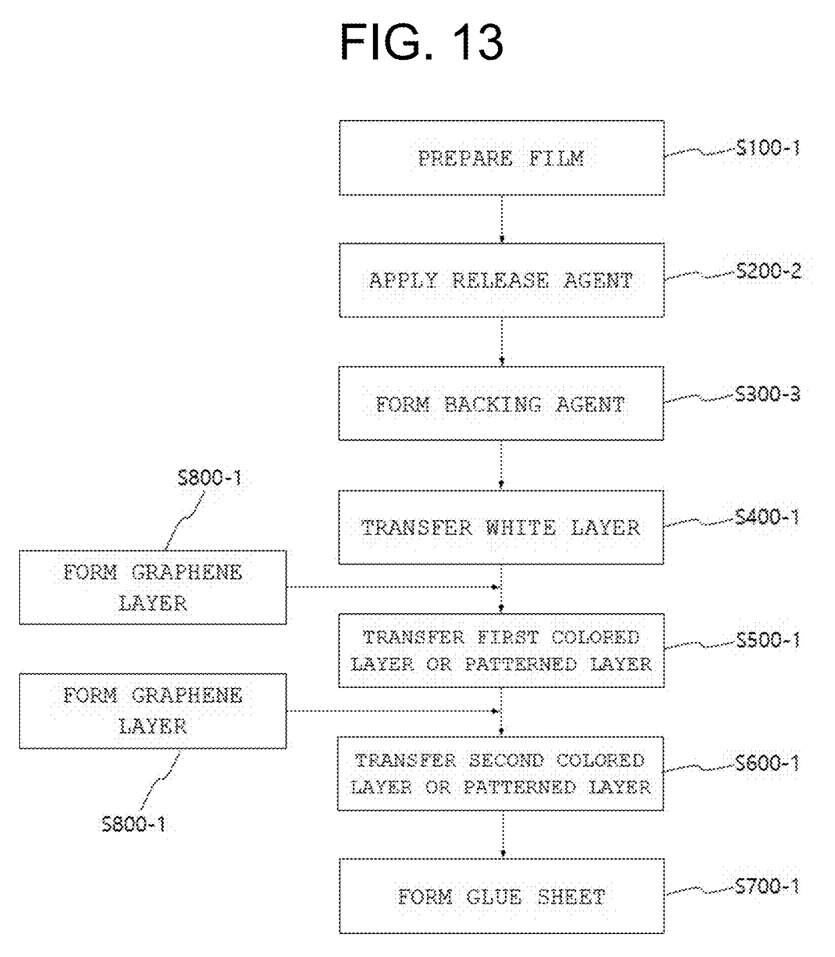

FIG. 10 is a flowchart of an arrow shaft manufacturing process according to an embodiment of the present invention, FIG. 11 is a flowchart of a camouflage fabric coating process of an arrow shaft according to an embodiment of the present invention, and FIGS. 12 and 13 are flowcharts of a transfer layer formation process of an arrow shaft according to an embodiment of the present invention.

First, a release agent is applied onto the outer circumferential surface of a mandrel (not shown) to facilitate form removal, and an adhesive is applied thereon. A carbon fiber sheet 200 of an arrow shaft, which has been formed by prepreg treatment and appropriately cut to a predetermined length, is wound around and adhered to the outer circumferential surface of the mandrel. Specifically, a first carbon fiber sheet layer 210 which is the lowermost sheet layer of the carbon fiber sheet 200 of the arrow shaft is adhered to the surface of the mandrel, and the carbon fiber sheet 200 of the arrow shaft is laminated and wound around the mandrel using a rolling device (not shown) (S1). This process is referred to as a rolling process.

A film is wound around the outermost surface of the mandrel laminate, which results from the rolling process, using a taping device (not shown). This process is referred to as a taping process, and a PET film or an OPP film is preferably used as the film. The taping process is performed before the product which results from the rolling process is shaped and is for discharging air remaining between sheet layers to the outside and increasing the internal lamination of the product.

Afterward, the taped mandrel and sheet laminate are shaped by varying a temperature step by step for a predetermined time, and the mandrel is removed. In this case, the preferable shaping temperature ranges from about 80 to 150° C., and the heating time is appropriately about 1 to 4 hours. Then, both ends of the arrow shaft body, from which the mandrel has been removed, are cut so that the arrow shaft body has a required length, e.g., a length of about 825 mm, the film is removed, and then the outer circumferential surface of the arrow shaft body is grinded by a centerless grinding process.

The arrow shaft 100 is manufactured through the above-described processes, and, according to the present invention, a camouflage fabric 300 cut to a predetermined size is prepared (S2), a transfer layer 500 formed by performing transfer at least three times is applied onto the camouflage fabric 300 (S3), and then the camouflage fabric 300 is wound around the outermost layer of the carbon fiber sheet 200 (S4).

Specifically, a camouflage fabric 300 which has a color/color sense, a pattern, or the like is prepared (S10). Subsequently, a process of forming a curing agent layer is performed (S60), and a process of applying a resin onto the lower surface of the camouflage fabric 300 with a curable adhesive and curing the resin is then performed (S20). In this case, the resin may be included at about 40 to 50 wt % and is preferably included at 45 wt %. Within this range, adhesion and curing power may be most effectively provided.

After the resin is cured, a process of applying a transfer layer 500 is performed (S30). Subsequently, a process of forming a curing agent layer is performed (S60), a process of applying a resin onto the upper surface of the camouflage fabric 300 and curing the resin is performed (S40), and then a process of forming a release paper is performed (S50).

The process of forming a transfer layer 500 according to the present invention will be described. As shown in FIGS. 12 and 13, a base film for coating is prepared (S100). Afterward, a release agent for form removal is applied onto the lower surface of the film (S200), a backing agent is applied (S300), and at least one of a white layer, a colored layer, and a patterned layer is transferred a total of three times or more (S400 to S600). For example, the transfer layer may be formed by combining a white layer, a colored layer, and a patterned layer in varying orders depending on the color, color sense, or pattern of the camouflage layer 300. In some cases, a process of forming a graphene layer (S800) is additionally or optionally further performed between the transfer processes (S400 to S600).

According to the present invention, in the formation process of the white layer, colored layer, and patterned layer, a curing agent may be added at about 1 to 5 wt % and is preferably added at 3 wt %. By including the above-described content of the curing agent in the white layer, colored layer, and patterned layer, curing is effectively achieved in the transfer process, and thus the pattern, color sense, or the like of the camouflage fabric 300 may be more clearly visible.

Finally, a release agent is applied onto one surface of the transfer layer prepared as described above (S900), and a glue sheet is wound several times around the color layer (S700), thereby completing the process of forming the transfer layer 500.

As described above, a process of forming the transfer layer 500 thus formed on one surface of the camouflage fabric 300 may be performed.

An arrow shaft including a carbon fiber sheet having a transfer layer formed thereon according to the present invention is formed by arranging and laminating carbon fibers in a specific form on a hollow straight tube and has a plurality of transfer layers formed to allow the pattern of the outermost sheet layer to stand out, and thus the pattern of the outermost sheet layer can be more clearly visible.

However, the effect of the present invention is not limited to the effect described above, and other effects not described above will be clearly understood by those skilled in the art from the scope of the following claims.

It will be understood by those skilled in the art to which the invention pertains that the present invention can be implemented in various other forms without changing the technical spirit or essential features of the present invention. Therefore, it should be understood that the embodiments described above are only exemplary in all aspects and not limiting. It should be construed that the scope of the present invention is defined by the appended claims rather than by the detailed description and that all changes or modifications derived from the meaning and scope of the claims and equivalent concepts thereof are encompassed in the scope of the present invention.

What is claimed is:

1. An arrow shaft comprising a carbon fiber sheet having a transfer layer formed thereon,
    wherein the carbon fiber sheet is formed to extend in one direction and includes a plurality of carbon fiber layers in which a camouflage layer is formed on at least a part of an outermost layer thereof, and
    at least one transfer layer is formed on one surface of at to least one of the carbon fiber layer and the camouflage layer.

2. The arrow shaft of claim 1, wherein a resin layer is formed on at least one surface of the camouflage layer and the transfer layer.

3. The arrow shaft of claim 2, wherein the resin layer includes an adhesive resin at 40 to 50 wt %.

4. The arrow shaft of claim 1, wherein the transfer layer includes:
    a film layer;
    a backing agent applied onto the film layer;
    a release agent formed on the backing agent;
    a white and colored background layer formed at least once; and
    a glue sheet layer formed on the background layer.

5. The arrow shaft of claim 4, wherein the background layer includes a curing agent at 1 to 5 wt %.

6. The arrow shaft of claim 1, wherein the transfer layer has a brightness of 50% or less with respect to 100% of a brightness of the camouflage layer.

7. The arrow shaft of claim 1, wherein the transfer layer is formed by performing transfer at least three times.

8. The arrow shaft of claim 7, wherein the transfer layer has a white-white-white color or a white-pattern-pattern color.

9. The arrow shaft of claim 1, wherein the transfer layer at least partially includes graphene.

10. The arrow shaft of claim 1, wherein the camouflage layer includes 70 to 90% cotton and 10 to 30% nylon.

11. The arrow shaft of claim 1, wherein the transfer layer further includes a reflective material.

12. The arrow shaft of claim 1, wherein carbon fibers in the plurality of carbon fiber layers are cross-arranged in a direction of 0 to 90 degrees.

13. A method of manufacturing an arrow shaft including a carbon fiber sheet having a transfer layer formed thereon, the method comprising:
    sequentially forming an adhesive resin layer and a transfer layer on at least one surface of a carbon fiber sheet including a plurality of carbon fiber layers,
    wherein the formation of the transfer layer includes:
    applying a backing agent onto at least one surface of a film;
    forming a release agent on the backing agent;
    forming a white and colored background layer at least once; and
    forming a glue sheet layer on the background layer.

14. The method of claim 13, further comprising forming a camouflage layer on an outer surface of the glue sheet layer of the carbon fiber sheet.

15. The method of claim 14, wherein an adhesive resin layer and a release layer are sequentially formed on one surface of the camouflage layer.

16. The method of claim 14, wherein the resin layer includes an adhesive resin at 40 to 50 wt %.

\* \* \* \* \*